(12) United States Patent  (10) Patent No.: US 6,487,862 B1
Doorley                     (45) Date of Patent:  *Dec. 3, 2002

(54) LOW COST JET ENGINE

(76) Inventor: Richard B. Doorley, 124 Van Wyck Ave., Pittsburgh, PA (US) 15227

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 580 days.

(21) Appl. No.: 08/739,027

(22) Filed: Oct. 28, 1996

(51) Int. Cl.$^7$ .................................................. F02C 7/26
(52) U.S. Cl. ........................................... 60/778; 60/787
(58) Field of Search .................... 60/39.02, 39.141, 60/39.142, 736, 778, 787

(56) References Cited

U.S. PATENT DOCUMENTS

| | | | | | |
|---|---|---|---|---|---|
| 2,808,702 A | * | 10/1957 | Dotson | ..................... | 60/39.141 |
| 2,941,790 A | * | 6/1960 | Comptonb | ................ | 60/39.142 |
| 3,080,716 A | * | 3/1963 | Cummings | ................... | 60/736 |
| 3,195,307 A | * | 7/1965 | Tyler et al. | ............... | 60/39.281 |
| 3,747,340 A | * | 7/1973 | Fenton et al. | ............ | 60/39.182 |
| 4,557,704 A | * | 12/1985 | Ito et al. | ...................... | 464/181 |

OTHER PUBLICATIONS

James, David. "The Cobra Turbo–jet Engine" James Engineering Turbines Ltd.*
Marmion, Roger. "Roger Marmion's Turbocharger Turbine Page".*

* cited by examiner

Primary Examiner—Louis J. Casaregola
(74) Attorney, Agent, or Firm—Carothers & Carothers

(57) ABSTRACT

A low cost jet engine for ground based application which is constructed with a conventional automotive turbocharger including a compressor and a turbine. An independent small combustor unit is mounted on the turbocharger between the compressor and the turbine and adapted for taking in air from the compressor and combusting fuel with the compressed air to provide an exhaust for driving the turbine. Controls are provided for starting and controlling the operation of the engine. The jet engine is readily adaptable to many land based applications, such as for educational purposes and snow blowing applications.

4 Claims, 7 Drawing Sheets

LOW COST JET ENGINE

BACKGROUND OF THE INVENTION

The present invention pertains to jet engines and more particularly to jet engines adapted for ground-based applications, such as in industry and education, wherein conventional jet engines have proven wanting.

While it is not a new idea to use jet engines in industry, rarely are the full benefits realized. Because aircraft jet engines are designed to optimize their flight related functions, many of the features emphasized in the design make them unsuited for most other applications. Two serious obstacles to their use in industry are; high initial cost and low application efficiency.

Application efficiency takes into account all the economic factors related to the use to which the engine is put, the effectiveness in doing the work desired and innumerable other considerations. While jet engines are outstanding in reliability when used in aircraft with precise maintenance sheduling, they generally have proven unreliable when operated in an environment for which they were not designed, and when operation and maintenance are by personnel not properly trained. Maintenance costs are much higher than with reciprocating engines.

Aircraft turbojet engines are engineered, for example, with these goals: frontal area is kept minimum, ratio of power output to pounds weight in emphasized, fuel consumption for pound thrust is minimized, self-containment of ancillary drives and components is demanded, reliability and safety must be at maximum. These most rigid requirements result in high cost design. Many of these features may be compromised in designing for ground based operation.

They are almost always too powerful and fuel consumption is excessive. It can be assumed that a simple jet engine, even with a somewhat higher specific fuel consumption, will have a higher application efficiency when designed to the specific industrial use. The poor application efficiency of aircraft jet engines when adapted to industrial use is illustrated by the high operating costs and low reliability of the jet powered snow blowers used by railroads.

In spite of complexity and cost, turbojet engines have been adapted to a limited extent to ground based power generation. For example: where high temperature and high velocity exhaust gas can be used for blowing or moving gasses, thawing, melting and drying; where enormous shaft power is required; and where suitable fuel is plentiful.

As fundamental principals of design and operation of the engine of this invention are the same as used in the design of the more complex airplane turbojet engine, it is inherently more suitable for training engineering students in the fundamentals of turbojet engine design.

SUMMARY OF THE INVENTION

The low cost jet engine of the present invention is intended for ground based application and is simply constructed of a conventional automotive turbocharger, which includes a compressor and a turbine, and an independent combustor mounted on the turbocharger between the compressor and the turbine. The combustor is adapted for taking in air from the turbocharger compressor and combusting fuel with the compressed air to provide an exhaust for driving the turbocharger turbine. Appropriate controls are provided for starting and controlling the operation of the engine.

This invention is a turbojet engine which is both simple and low cost with the proven automotive turbocharger as the its core. With its proper design of; combustor, ancillary components and systems, and controls, is inexpensive and highly reliable. Much of its construction is from mass produced components. Also, with its simplicity of design and only one rotating part, repairs are easily accomplished and the mass produced commercial parts are inexpensive. The ability to tailor engine design to specific industrial uses results in an application efficiency not achievable by adaptation of aircraft jet engines.

Reducing the complexity brings with it a loss in specific fuel consumption in comparison to conventional turbojet engines. This efficiency loss is relatively unimportant in applications of supplying emergency power, replacing manual labor, blowing snow, thawing materials, propelling granular materials, training engineering students and many other uses.

The principal components of a typical turbojet aircraft engine are the compressor, turbine, and a fuel combustor. Ancillaries are; lubricating system, fuel management system, staring system, controls and instrumentation.

As aircraft engines must be self-sustaining, these ancillaries are driven by shaft output from the jet engine, through a gearing mechanism. This feature is a major and often unnecessary cost and complication in ground based applications.

Examples of application efficiency in design are important features gained by using outside power to drive the ancillaries. Oil under pressure is supplied at the bearings before a start is attempted; pressure is maintained at the bearings during spinning down after a shutoff. This both assures lubrication after shutoff and cools the bearings and turbocharger housing to prevent coking of oil (forming carbon) which eventually destroys the turbocharger. Also, fuel pressure is available prior to the start attempt.

The forced lubrication system for pumping lubrication oil through the turbocharger is provided with a means for heating the oil at selected times, such as at start-up when the oil is cold. In addition, the lubrication system preferably includes a fuel heat exchanger that is adapted for heating fuel for the combustor with the lubrication oil. The lubrication oil may also be cooled with a heat exchanger that includes a cooling core that is adapted for cooling the lubrication oil flowing through the core. The cooling core is normally positioned at the intake of the turbocharger compressor for cooling the core with compressor intake air.

The oil heat exchanger further preferably includes a thermostatic bypass valve adapted for bypassing flow quantities of lubricating oil around this cooling core when temperature of the lubricating oil attains a predetermined minimum, in order to prevent the lubrication oil from becoming undesirably low.

The fuel supply system for supplying fuel under pressure to the combustor for combustion includes a throttle valve that is adapted for bypassing flow of fuel to the combustor for thereby regulating fuel supply to the combustor. Accordingly, the fuel supply is continuously circulated and when fed to the combustor nozzle, the quantity of fuel through the throttle is regulated by bypassing quantities of the fuel that is being recirculated to the nozzle. The fuel is also preferably heated by the use of a heat exchanger from the lubrication oil. An additional heating element is also provided for initially heating fuel supplied to the combustor during start-up.

An air nozzle adapted for directing compressed air from an independent source into the compressor of the turbocharger is provided for inducing start-up rotation of the turbine. A pressure sensor in the combustor is provided and adapted for discontinuing the flow of air from the nozzle and for discontinuing an externally supported fuel ignitor in the combustor when a predetermined minimum pressure for self-sustaining operation of the engine is attained.

This invention is a low cost turbojet engine manufactured around the automotive type turbocharger. The combustor, turbine and rotating components are of design and construction well known to the industry. The invention is in having designed in solutions to engineering and manufacturing problems for achieving a simple, reliable, low cost engine.

Product developers who attempt to adapt aircraft design jet engines to their needs will find the versatility of this invention to be the solution to their problems. For applications which require high temperature high velocity gas movement as a means of doing work at specific jobs can design their product around this engine.

Designers of jet engines or their components find it extremely costly and inefficient to test their design ideas on giant multi-burner aircraft type engines. My inventions allow these tests to be set up and run quickly and inexpensively, yet yielding the test data necessary for checking the design.

During heavy snow falls, railroads are faced with need for removing snow from track switches to assure their movement as directed. With the many products which are used for this purpose, still the largest number of switches cleared are by hand with broom and shovel. This problem is particularly critical in marshalling yards with thousands of switches to be cleared quickly.

Of many possible embodiments of this invention, the three preferred embodiments descriptions follow: 1) BASIC MULTI-USE JET ENGINE, 2) EDUCATIONAL & EXPERIMENTAL JET ENGINE PACKAGE, and, 3) SNOW BLOWER FOR RAILROADS.

BRIEF DESCRIPTION OF THE DRAWINGS

Other objects and advantages appear in the following description and claims. The drawings show, for the purpose of exemplification, without limiting the invention or claims, certain practical embodiments of the present invention wherein:

DESCRIPTION OF THE PREFERRED EMBODIMENTS

Multi-Use Jet Engine

With most ground based applications, power sources are available to satisfy requirements for the jet engine's ancillaries (pump drives, electrical ignition and control, and compressed air). Therefore, in designing for maximum versatility while lowering complexity and cost, a mechanical drive for shaft output and for driving the ancillaries is not included in this embodiment.

In this invention, original and inventive designs are incorporated into; 1) Mechanical System, 2) Lubrication System, 3) Fuel System, 4) Instruments and Controls System, and 5) Starting System, and in combinations thereof.

An electric motor, powered form an outside source or from an integral motor/generator, drives the ancillaries (fuel pump and lubricant pump while supplying electricity to instruments and controls). Compressed air for starting may be drawn from an outside source, or, as for a mobile configuration, may also be from an integral air pump driven by the ancillaries electric motor.

Figure 1:
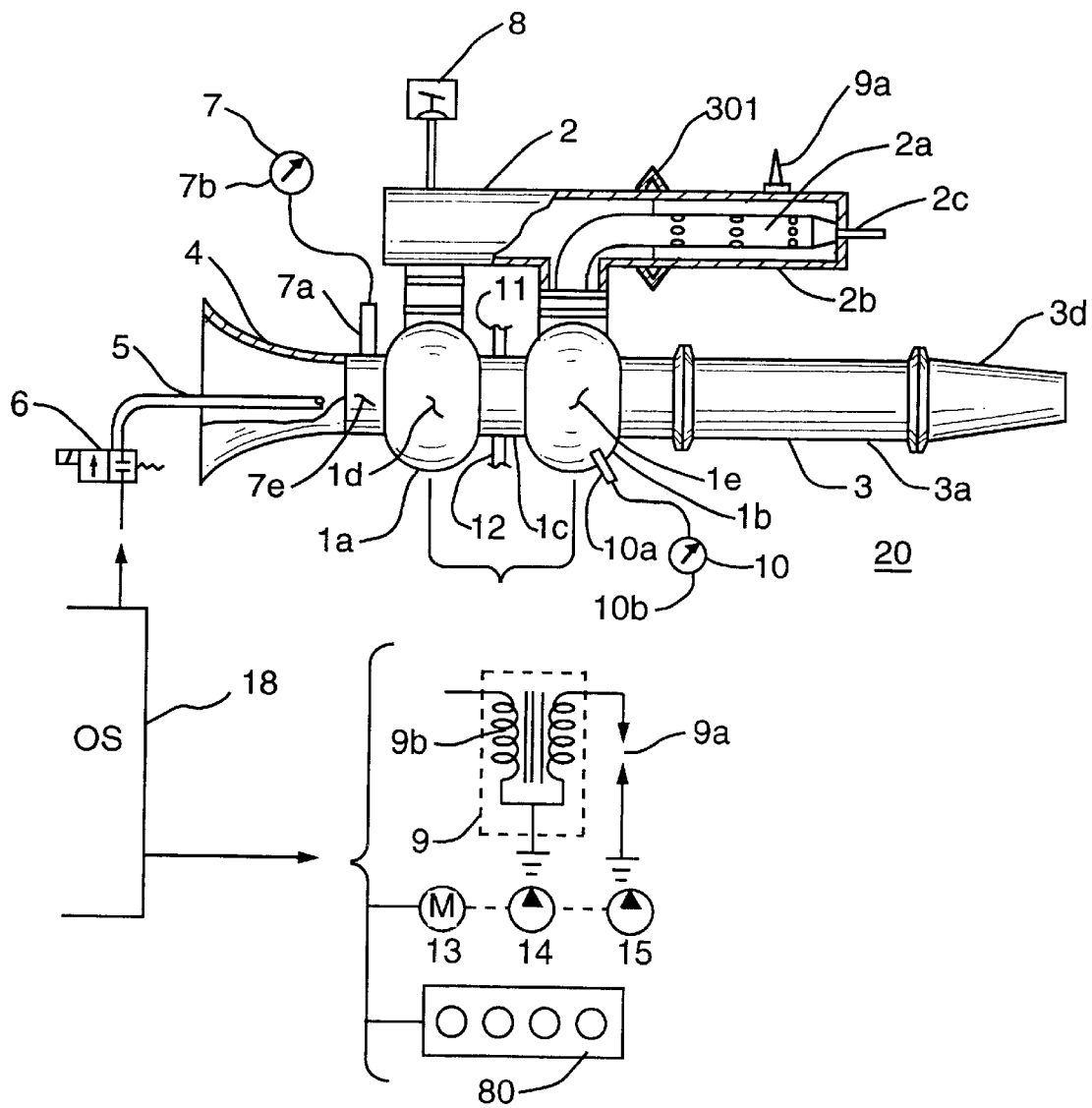
FIG. 1 is a schematic diagram illustrating one embodiment of the low cost jet engine of the present invention.

The multi-use jet engine is shown schematically in FIG. 1 in general arrangement as one preferred embodiment of this invention. This ready-to-run jet engine 20 is suitable for being adapted to selected ground based applications by manufacturers and users who find reciprocating and conventional jet engines inadequate for reasons stated above.

Referring to FIG. 1, multi-use jet engine 20 includes in part a conventional automotive style turbocharger 1 having a compressor assembly 1a, a turbine assembly 1b, and a center assembly 1c, containing the rotating parts which include the compressor wheel 1d, turbine wheel 1e, and connecting shaft and bearings. The remainder of the jet engine includes the combustor assembly 2, including a burner assembly 2a, combustor housing 2b, and a fuel nozzle 2c.

The jet engine 20 is also provided with tail pipe 3, intake horn 4, air starting nozzle 5, and air starting valve 6, feeding nozzle 5.

A tachometer instrument 7 is provided with a magnetic pick-up 7a, and a tachometer meter 7b, which further includes an impulse wheel 7c for counting revolutions.

Some of the additional controls for the jet engine include combustor pressure switch 8, ignition system 9, such as used for fuel oil furnaces, including a spark plug type ignitor 9a, powered by high voltage ignition transformer 9b.

A TIT gauge 10 is provided for measuring turbine inlet temperature with a thermocouple 10a driving meter 10b.

Oil line 11 feeds the jet engine turbocharger bearing in the turbocharger center section for assembly 1c. Oil line 12 discharges oil from the jet engine's turbocharger.

Electric motor 13 drives the auxiliaries, including oil pump 14 and fuel pump 15. All of these components per se or as individual items are of known design.

For stationary jet engine applications, outside sources item OS designated at 18, are required to aid in starting or running the engine as: compressed air to starting valve 6, and electricity for motor 13, transformer 9b and for instrumental and controls 80.

When the engine is running, as with aircraft engines, compressor 1a ingests ambient air, compresses it and pumps it into the combustor housing 2b, thence into burner assembly 2a. Fuel is injected via fuel nozzle 2c, is burnt within burner 2a and exhausted at high temperature and high velocity into turbine 1b. A portion of the kinetic/heat energy of the entering gasses is converted to mechanical energy via the rotating components, to power the compressor, for completing an energy-conversion cycle. The hot gasses resulting from combustion exit turbine 1b to the atmosphere through tail pipe 3 for conducting the useful work intended.

Figure 2:
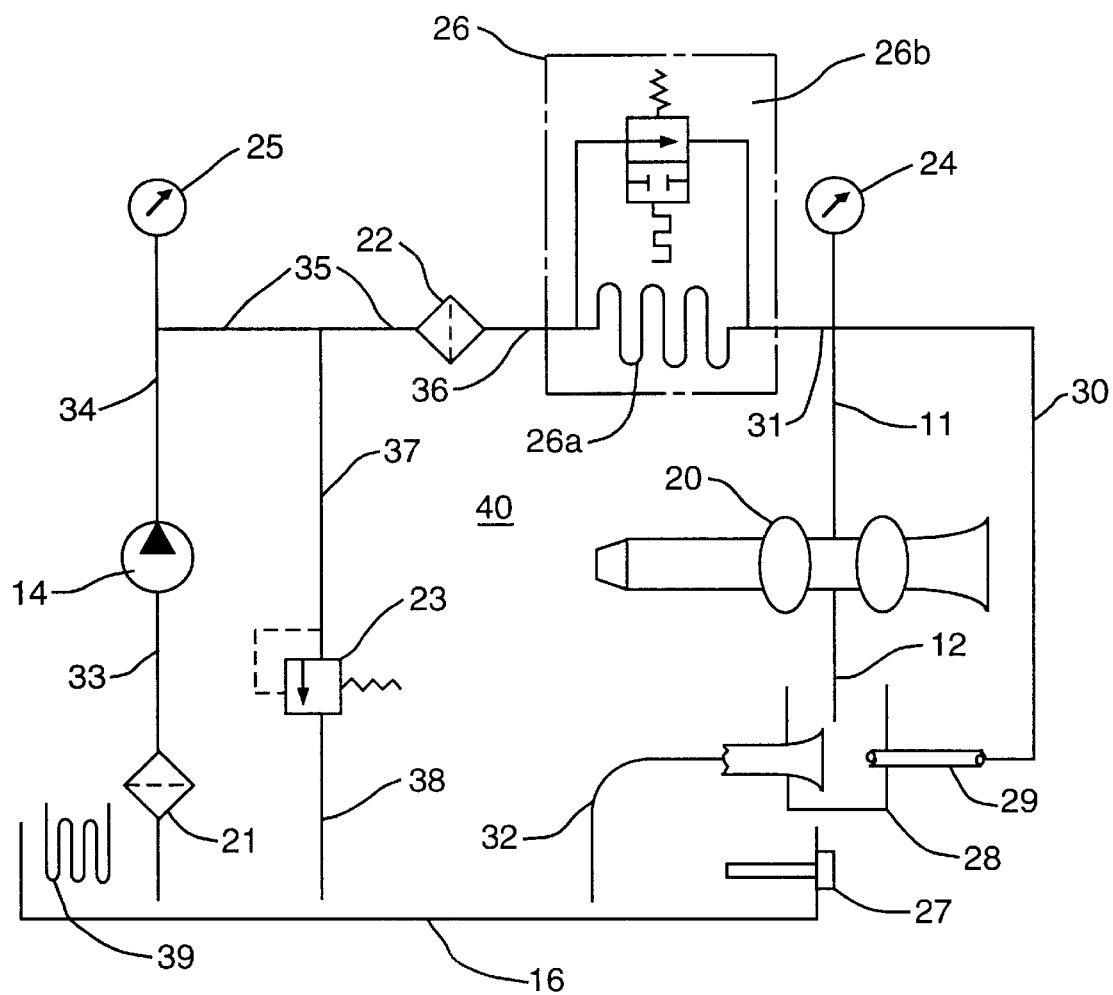
FIG. 2 is a schematic diagram illustrating the lubrication system for the jet engine shown in FIG. 1.

With reference to FIG. 2, a schematic diagram of simplified lubricating system 40 is shown for jet engine 20. The lubricating system includes reservoir 16 for storing lubricating oil and pump 14 for circulating the lubrication oil. The pump is driven by ancillary electric motor 13.

The system also contains the usual suction strainer 21, filter 22, relief valve 23, pressure gauge 24 and temperature gauge 25.

The lubrication oil absorbs a considerable quantity of heat from its cooling of the engine. Heat exchanger 26, with core 26a and the optional thermostatic valve 26b is used in either of two arrangements. When it is placed immediately in front of horn 4 it acts as a self-regulating cooler. With the heat generated by combustion being in proportional to the air volume ingested (as is the fuel-burning rate), the air flow through core 26a is in like proportion. Should more precise temperature control be desired, thermostatically controlled valve 26b bypasses oil around the core as needed, to maintain the desired preset temperature.

For various reasons dictated by engine applications, heat exchanger 26 may be mounted elsewhere with a motor driven fan or other well known means for removing excess heat.

Kinetic viscosity of cold oil at the shaft bearings, particularly during winter weather, causes severe drag when spinning up the engine for starting. To obtain self-sustaining speed with cold lubricating oil requires excessive starting power. For that reason, and to assure proper lubrication during start, it is best that the oil be prewarmed to reduce its viscosity for a cold start. Submerged heater 27 (electric or a heat exchanger from an external heat source) is provided for preheating the oil before a first start in a series. Once the engine has been run and stopped the oil will retain its lower viscosity for a considerable standby time for a subsequent start.

As automotive type turbochargers are designed to be mounted onto the auto engine's exhaust manifold, the hot oil, after having passed through the turbocharger bearings, must fall by gravity directly to the crankcase of the engine on which it is mounted. Back pressure, as from having the return line 12 submerged in the reservoir oil, would cause leakage through the turbocharger bearings. Therefore, for permitting the most compact configuration, the jet engine can be mounted atop the reservoir with line 12 entering the reservoir above the lubricant level. While that is suitable for many single engine applications, it is not so for multiengined installations (more than one engine served by a single reservoir), or where an engine must be remote from the reservoir. Such installations require a means for returning the discharged oil to the reservoir.

The embodiment here shown is with the engine located remotely from the reservoir for depicting this oil transfer means. Small oil sump 28, is installed immediately below the engine for receiving return oil. Fluid injector 29 of known design (or other means, such as a mechanical pump), powered by oil from line 30 which is branched at pressure line 31, imparts velocity to return the oil to the reservoir through line 32.

The primary function of the lubrication system is to maintain adequate lubrication of the jet engine bearings in the center section of the turbocharger. To accomplish this the fluid pressure and flow rate to the bearings must be adequate, and a recommended maximum oil temperature must not be exceeded. In the circuit of this invention, oil is drawn by pump 14 from reservoir 16 though strainer 21 and line 33 into the pump. From the pump it is forced through lines 34 and 35, filter 22, line 36, heat exchanger 26, and lines 31 and 11 to the jet engine. After having lubricated and cooled the engine and bearings, the oil is discharged through line 12 directly to reservoir 16 (if the jet engine is mounted atop 16), or to sump 28 thence to 16 by line 32. If a sump is in the circuit, the orificed jet nozzle in the injector meters only a small flow rate from oil supplied by line 30 for powering the injector.

If the pump should produce a greater volume of oil than the system can handle, relief valve 23 bypasses the excessive quantity from line 35 through lines 37 and 38 to the reservoir.

Under normal operating conditions the oil entering heat exchanger 26 will be at a temperature higher than is desirable for proper lubricating. As this hot oil passes through core 26a the cooling air passing through reduces the temperature to a safe value. Should the oil reach the heat exchanger at a temperature too low, thermostatic valve 26b will bypass a sufficient quantity around the core to reduce the cooling effect of the heat exchanger.

To produce atomization of fuel at the fuel nozzle, it is desirable to heat the fuel prior to its reaching the nozzle. Heat exchanger 39, in the fuel circuit and located in reservoir 16, serves this purpose. Its function is described immediately below.

Figure 3A:
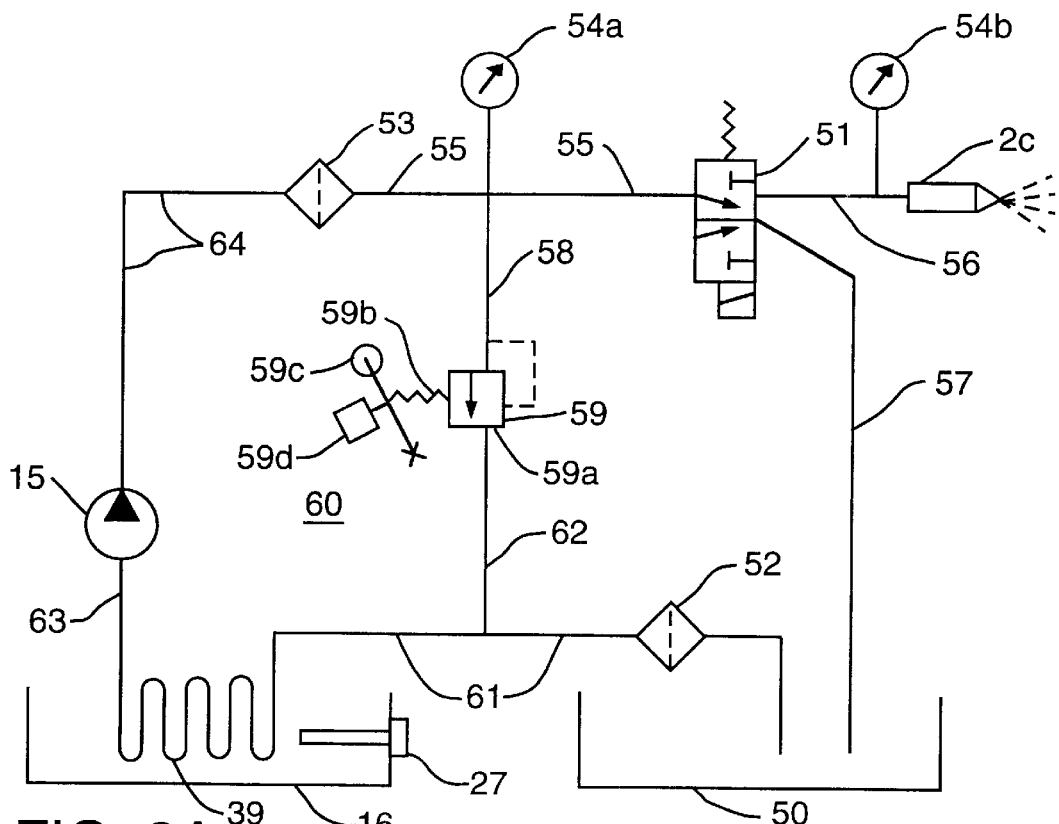
FIG. 3A is a schematic diagram illustrating the fuel system for operation of the jet engine illustrated in FIG. 1 in standard environments.

Referring to FIG. 3A, the fuel system 60 is schematically shown. Aircraft type jet engines have extremely complicated fuel controls, termed "fuel management systems", for controlling engine speed and for protecting against over or under fuel supply to the engine. This invention makes use of a commercially available inexpensive relief valve modified to act as relief valve, pressure regulating valve, flow control valve and throttle valve 59.

In the design of pressurized liquid circuits, common practice for limiting actuator forces and for protecting system components from damage is to contain a pressure regulator or pressure relief valve. Pressure reducing valves are often used in a circuit branch to maintain a fixed pressure lower than the supply pressure, regardless of flow demands. A common relief valve contains a spring loaded shutoff ball or plunger, which spring is at a preset value. Over pressure in the circuit lifts the ball or plunger to divert fluid to tank, thereby limiting the pressure.

Throttle valve 59, (with body 59a; loading spring 59b, throttle lever 59c; and engine off switch 59d) differs from common valves in that during operating cycles the pressure-setting spring is variably compressed from minimum (corresponding to "Off" throttle position), to maximum (corresponding to full-speed "Run") by linkage from throttle lever 59c. At the extreme "Off" position the linkage exerts no force on the spring 59b, consequently no fuel is fed to the nozzle. At the maximum "Run" position, with throttle valve 59 acting as a throttle valve, spring 59b is forced to maximum compression. This raises the fuel pressure, therefore engine speed, to the engine designed limit. Should the pressure tend to climb beyond any setting for any reason, throttle valve 59, now acting as a relief valve, dumps the excess volume necessary to limit the pressure to the set level. The fuel pressure, therefore the supply to the fuel nozzle, is infinitely variable from zero to maximum.

Heat exchanger 39 is immersed in reservoir 16. Tank 50 is utilized for storing liquid petroleum fuel and fuel pump 15 is driven by motor 13 to circulate fuel in the system. Fuel is fed to fuel nozzle 2c which is controlled by solenoid operated fuel valve 51. Conventional items include a suction strainer 52, pressure filter 53, and a pressure gauge 54a in line 55 to measure pressure from the filter to valve 51, and a pressure gauge 54b in line 56 to measure pressure from valve 51 to the nozzle. Line 57 is a return line to tank when the engine is not running. Line 58 is a pressure line from line 55 to throttle (and relief) valve combination 59, which when the engine is running bypasses excess fuel through lines 62 and 61 to heat exchanger 39.

Under steady state operation of the engine at a selected speed, throttle valve 59 acts as a pressure reducing valve, maintaining a fixed flow rate through nozzle 2c.

The fuel system operates in two modes. In standby mode, pump 15 is running but the engine is not (fuel valve 51 not actuated) so fuel diverges through two paths. Fuel is drawn by pump 15 through strainer 52, line 61, heat exchanger 39, line 63, and into the pump. It is then pumped through line 64, filter 53 and line 55, from which it passes into two circuit branches.

Maximum flow is through open fuel valve 51 and line 57 to storage tank 50, Secondary flow is by line 58, through unactuated throttle valve 59, lines 62 and 61 to heat exchanger 39 (where it is reheated) and line 63 to pump 15.

In the engine running mode, with throttle lever positioned at "start" or "run" position, throttle valve 59 is partially or fully actuated by the throttle lever 59c, and throttle switch item 59d is now released to energize fuel valve 51 (to the position opposite that shown in this drawing). With fuel valve 51 operated and throttle valve 59 partially or fully set to pressurize lines 64, 55 and 58, fuel passes through valve 51 to line 56, to be discharged through nozzle 2c. Consequently, principal fuel flow is to nozzle 2c. Excess fuel (that output from the pump beyond which nozzle 2c discharges) passes through throttle valve 59, lines 62 then 61 to heat exchanger 39 and line 63 to the pump.

This recirculating within the system loop minimizes heat lost by the fuel and permits it to be reheated. This is particularly effective when it is most needed at low or idle speeds at which the least heat is being generated by the jet engine.

Make up fuel, replacing that sprayed from fuel nozzle 2c, is drawn from fuel tank 50, through strainer 52, into the fuel loop at line 61. By this means, only makeup fuel needs heating.

At low temperatures kerosene and diesel fuels tend to form crystals which clog filters and cause system cavitation. With the large store of fuel required by jet engines for many hours of continuous operation, means must be furnished to keep this supply at least warm. To alleviate this condition when operating this invention under extreme cold environments, an effective modification of the fuel circuit FIG. 3A is shown in FIG. 3B.

Figure 3B:
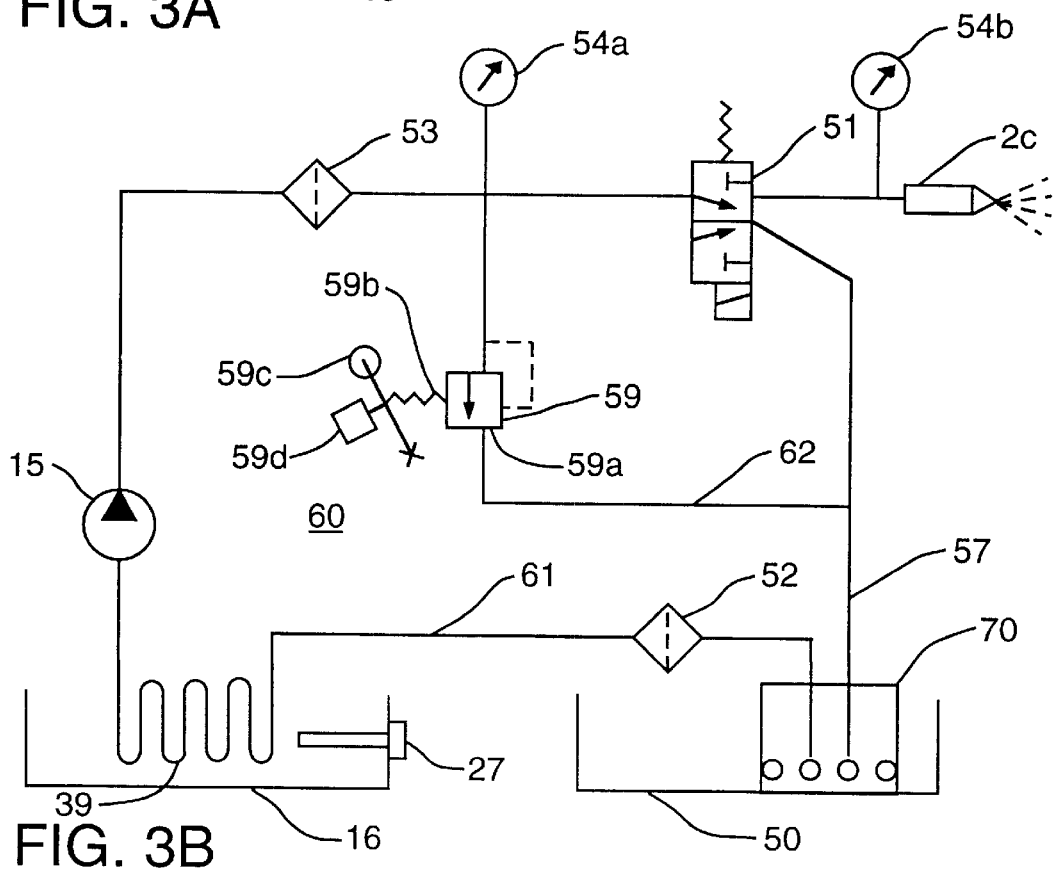
FIG. 3B is a schematic diagram of the fuel system for the jet engine illustrated in FIG. 1 modified for operation in cold environments.

Referring to FIG. 3B, fuel system 60 has improvement for low temperature operation as shown. In FIG. 3B, a modification of FIG. 3A, line 62 is disconnected from line 61 and is then joined to line 57, such as to allow all excess heated fuel (that not consumed during standby or operating cycles) to reenter the fuel loop. Meanwhile, the fuel regains what heat it loses as it preheats only a small quantity of stored fuel.

Standpipe 70 is an open top cylindrical insert submerged in the stored fuel in tank 50. Makeup fuel enters the standpipe through a few small openings near the tank bottom. Heated return fuel enters the standpipe via line 57 which discharges below fuel level. A portion of the heat energy of the returned fuel will mix with the fuel within the standpipe to warm it sufficiently to eliminate crystallization. Also, air or vapor which might be entrained in the return fuel will bubble to the top level of the fuel to be dissipated to the atmosphere. Thus, only crystal free and de-aerated fuel will be drawn into the fuel circuit through strainer 52.

Starting and Running the Jet Engine

To describe the cooperation of lubricating system 40 and fuel system 60, a normal start-up and run cycle is outlined below.

Item 5 is an air nozzle pipe for injecting air into the engine through horn 4 from solenoid air valve 6, which is connected to an outside source of compressed air. For stationary applications of jet engines this source can be from shop air supply or other means. For an engine installed on a mobile machine the source will be an on-board air compressor.

Assuming a first start with cold oil, the lubricating oil is preheated by in-tank thermostatically controlled heater 27. After the appropriate temperature has been reached, ancillary electric motor 13 is run to bring up oil pressure and to make fuel available.

With fuel pump 15 and lubrication pump 14 running, to initiate a start-up, throttle lever 59c is moved forward to the "Start" position. This releases throttle switch 59d to energize the ignition transformer 9b to fire ignitor 9a; opens air valve 6 to inject air through air nozzle 5 into the compressor 1a; and actuates fuel valve 51 to spray fuel by fuel nozzle 2c into burner 2a.

Figure 5:
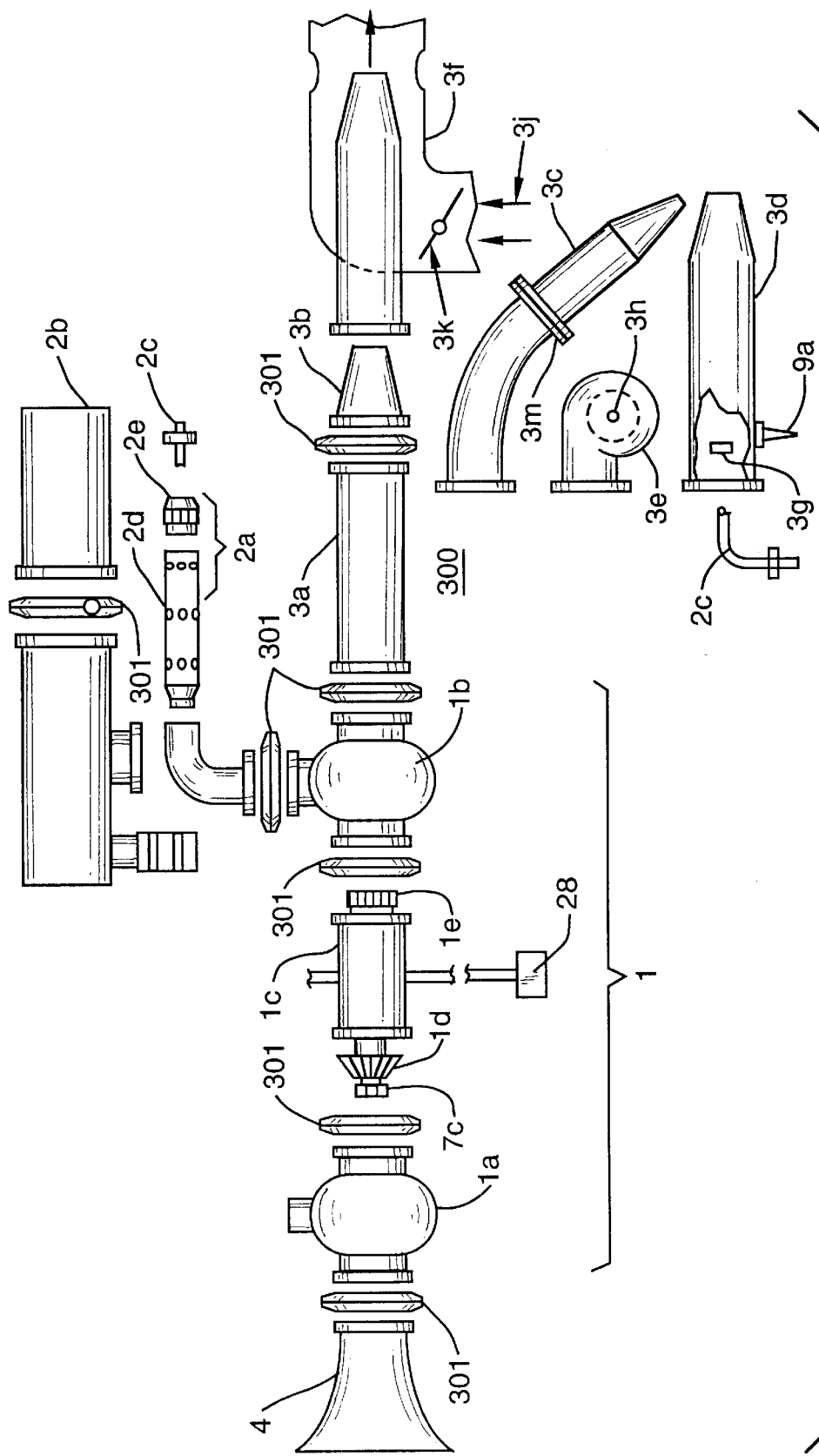
FIG. 5 is an exploded view of the major mechanical components of the jet engine shown in FIG. 1 and as further embodied as an educational and experimental jet engine package shown with multiple interchangeable exhaust nozzles.

This injection of high velocity air causes initial rotation of the compressor wheel item 1f, FIG. 5 (therefore, also the shaft and turbine wheel item 1g), and instigates a progressive starting program. At the moment of air injection to the propeller type compressor wheel, the wheel reacts to cause immediate movement of the rotating components. Meanwhile in air combustor burner 2a, fuel is sprayed through nozzle 2c into burner 2a at the rate required for a high speed idle. Ignition and burning of the fuel heats the air to cause its expansion as it passes through the burner into the turbine. Turbine wheel 1g reacts from the heat energy and kinetic energy of the exhaust gasses to increase the speed of the rotating assembly. This increase in rotational speed results in compressor 1a drawing in additional air to augment that from the starting system. Thus the engine continues to accelerate progressively to the predetermined idle speed.

Before start-up the pressure within compressor housing 2b is standard ambient air reference pressure ratio 1. Acceleration during a start-up gradually increases the pressure ratio toward full speed ratio of possibly 3 or more as the compressor performs its function.

When the pressure ratio within the combustor increases to that corresponding to self-sustaining engine speed, pressure switch 8 closes. This de-energizes solenoid air valve 6 (shutting off stating air) and opens the ignition circuit (deactivating transformer 9b and ignitor 9a). The jet engine is then idling above sustaining speed and the start-up sequence is terminated. Movement of the throttle lever by hand thereafter controls the speed of the engine to the limits of its design range.

To stop a run, throttle lever 59c is moved to the "Stop" position, the throttle valve simultaneously drops fuel pressure to zero, and contacts throttle switch 9d to deactivate fuel valve 51 to shut off the fuel. Standard operating procedure is to continue running the oil pump for maintaining oil pressure at the bearings until the rotating components coast to a stop, after which the system is shut down completely.

Figure 4A:
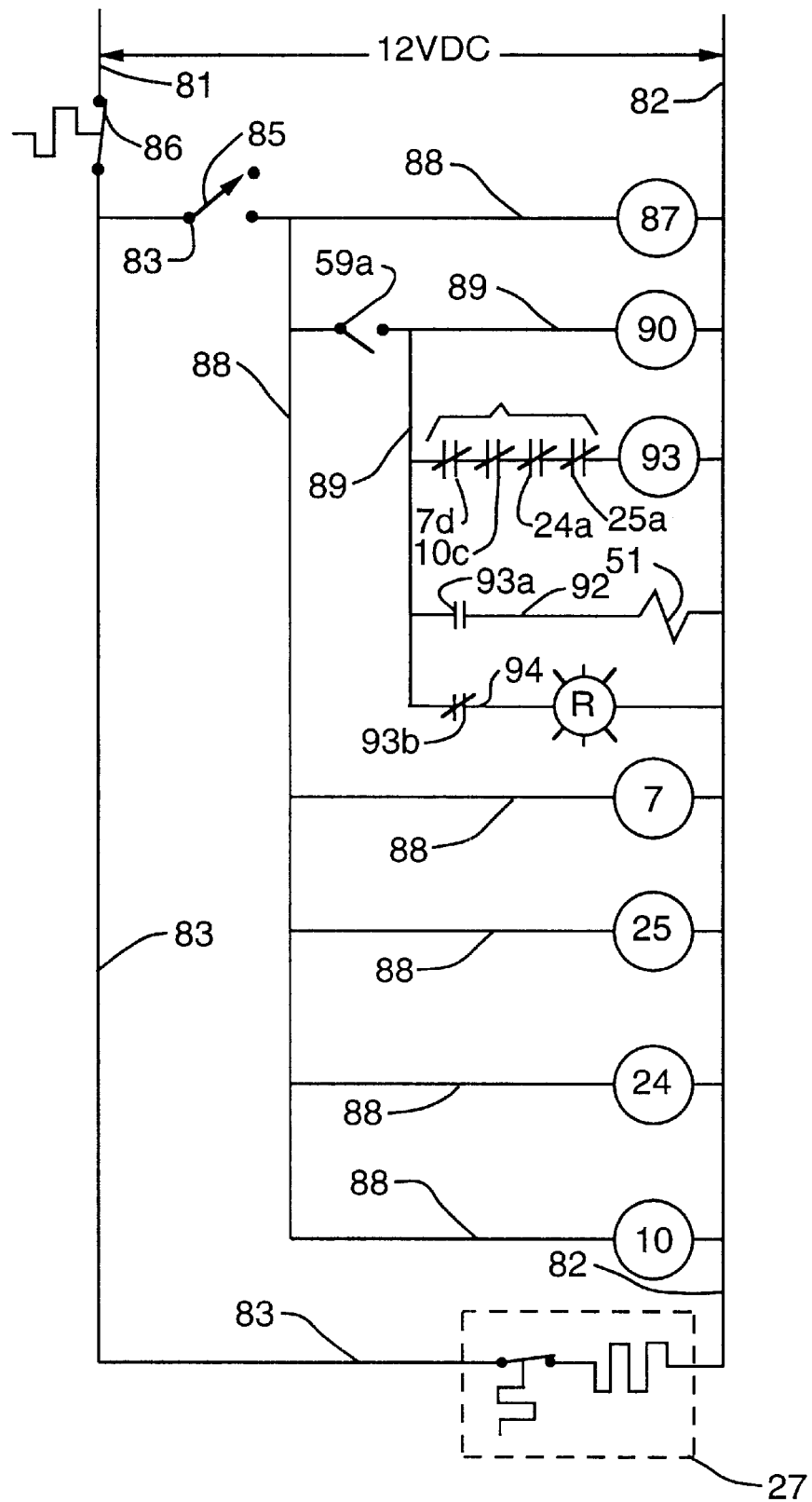
FIGS. 4A and 4B are schematic diagrams illustrating control systems for the jet engine illustrated in FIG. 1.
Figure 4B:
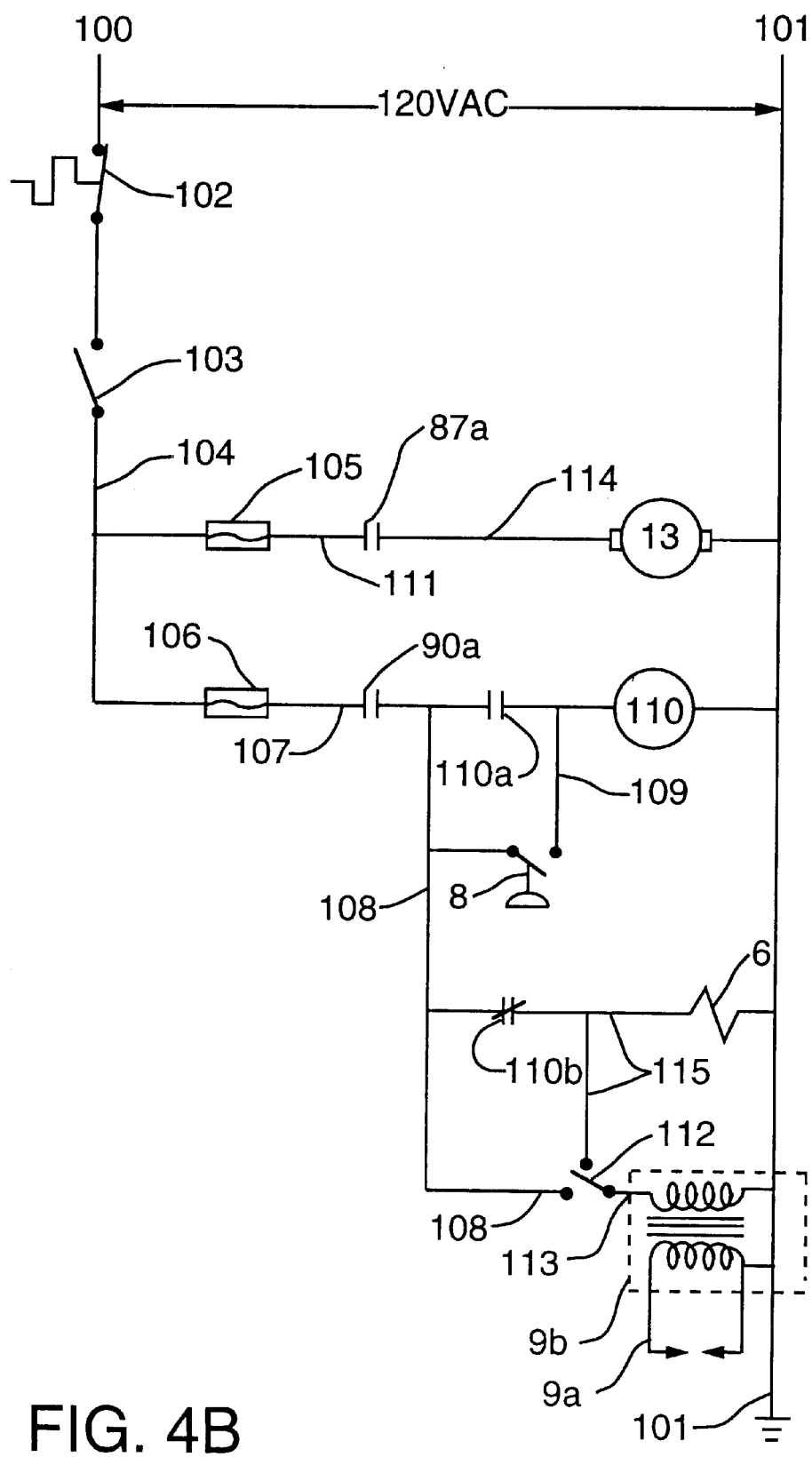

Detailed discussion of the functions of the various control components is given in reference to FIGS. 4A and 4B, immediately following.

In FIGS. 4A and 4B, schematics of the low voltage and high voltage instrument and control systems respectively are shown. This simplified system encompasses, minimum operating instrumentation, control components, and circuitry. The embodiments herein described use both low voltage DC electricity (FIG. 4A for instrumentation) and commercial AC voltage (FIG. 4B for preheating oil, ignition and motor drive).

While the control elements are shown in relay logic, it is obvious that digital logic can be directly substituted. As an example, if digital logic were to control through a microprocessor, pressure switch 8 could be replaced by an output from tachometer 7 to trigger a shutdown of compressed air and ignition at the RPM of self-sustaining speed.

Each operational instrument, well known in the industry, includes a signaling means (switch or electrical signal) for warning or controlling when a preset point in measurement has been reached, and can be programmed by circuit design to terminate a run when any one measured preset limit is exceeded. The recommended minimum number of operational instruments are: item 7, tachometer (engine rpm, with signal output item 7d); item 10, TIT meter (turbine inlet temperature with signal output 10c); item 24, oil pressure gauge (with signal output 24a); and item 25, oil temperature gauge (with signal output 25a).

In the AC voltage segment of FIG. 4B, wires 100 and 101 feed 120 volts AC to the control segment, which is protected with circuit breaker 102. The circuit further includes a master switch 103, wire 104 feeding the circuitry when 104 is "on", and a fuse 105. The circuit further includes motor 13, fuse 106, wires 107, 108, 109, 111, 113 and 114. Start relay 110 is provided with open contact 110a and closed contact 110b. Item 112 is an ignition mode switch and item 8 is a combustor pressure switch with an open contact and item 9 is an ignition system.

To start a jet engine, the rotating elements must be spun up by outside means to about 30% of top running speed. With running speed at or near 100,000 rpm, attaching a mechanical starting means to an automotive turbocharger would be a costly addition.

Prior to a start-up, a warming of the oil is required if the engine is cold. In this instance, master switch 103 is turned on and making an attempt to start is delayed until the oil in reservoir 16 reaches at temperature above 150°. Then, key switch 85 is turned "on" to cause motor relay contact 87a, from motor relay 87, to close to run motor 13 via wire 114. Pumps 14 and 15 are now running.

In the DC circuit of FIG. 4A wires 81 and 82 supply low voltage through circuit breaker 86 to wire 83 and to key switch 85. As shown in the schematics, both the 120 VAC and 12 VDC circuitry are in the "Off" condition.

To start and run the jet engine the following sequence is conducted: turn "on" switch 102 in the 120 VAC circuit. Turn "on" switch 85, in the DC circuit to; actuate, via wire 88, motor relay 87 thus starting motor 13, which runs fuel pump 15 and oil pump 14, while supplying electricity to throttle switch 59d and all instruments via wire 88.

Observe that oil pressure is 60 psi or greater, then move throttle lever 59c to the "start" position. Ignition-air relay 90 closes contact 90a (in the 120 VAC circuit) to send electricity from wire 107 to 108, through start relay closed contact 10b, to wire 115 thus to air valve 6. Also, electricity from wire 115 passes through switch 112 and wire 113 to ignition system 9. Controls are now set for a start-up.

Advance lever 59c to the "Start" position. Throttle switch 59d closes to wire 89, ignition-air relay item 90 and fuel relay 93, through the series of instruments contacts 91 (one each from; tachometer 7, oil temperature gauge 25, oil pressure gauge 24, TIT meter 10). Simultaneously three actions take place: compressed air valve 6 blasts air through air nozzle 5 to start the engine spin up; fuel relay contact 93a, in line 92, closes to actuate fuel valve 51 to spray fuel through nozzle 2c (into burner 2a); and ignitor 9a fires the fuel.

As the jet engine accelerates to self-sustaining speed, pressure switch 8 is actuated by the respective pressure level in combustor housing 2b to energize start relay 110. Relay 110 then performs these simultaneous actions; 1) Opens contact 110b to close air valve 6 (discontinuing starting air) and shuts off ignition transformer 9d (cutting ignition), and 2) closes contact 110a to seal itself in so to "remember" for the remainder of the run cycle that the automatic start cycle had been completed. Relay 110 will not drop out (even if combustor pressure drops below actuation pressure of switch 8) until throttle lever 59c has been returned to the off position.

Should any of the monitoring instruments sense a measured value exceeding that instruments level setting, that instrument's contact (or other form of output in group 91) opens line 92 to fuel relay 93. This drops out 93 which opens contact 93a to close fuel valve 51, to stop the engine. Indicator light 94 is connected to wire 89 through normally closed contact 93b (of the fuel relay) which then glows to indicate a fault shutdown.

A controlled shutdown is accomplished by the operator's pulling throttle lever 59c to "stop", which both closes fuel valve 51, through switch 59d, and unloads throttle valve spring 59b.

Ignition mode switch 112, allows the engine to operate with ignition system 9 firing continuously or for having it turn off after the engine reaches sustained speed. Switch 112 is shown in the schematic in the "automatic" mode, which will cut the ignition at sustained speed.

With ignition mode switch 112 in manual mode (continuous ignition) and a self-correcting shutdown is initiated (e.g., when the engine over-speeds and is shut off, or when a flame-out occurs, the engine then slows to normal range thus obviating the fault) the engine will reignite and accelerate to the throttle speed setting.

Description of a Second Preferred Embodiment

Education & Experimental Jet Engine Package

At universities and trade schools students of jet engine theory and practice most frequently receive only education on theory and little or no hand-on experience with a jet engine. Jet engines might be available to students as displays, but they are too complicated to disassemble, change and reassemble, and it is impractical to run one within the confines of a community.

The multi-use jet engine of the present invention also provides a practical jet engine for teaching the art and science of jet engine technology, and for permitting product designers and developers to study effects of anticipated engineering changes. This jet engine embodiment is to encourage students with quick disassemble and reassemble capacity. It is sufficiently small such that it can be installed and run in a university laboratory, with exhaust and noise ducted elsewhere and silenced.

The following is a description by way of a second embodiment of this invention: a package for education, experimentation and product development:

Referring to FIG. 5, jet engine package 300 includes the turbocharger 1 disassembled to show compressor 1a, turbine 1b, center section 1c, with compressor wheel 1d, turbine wheel 1e and impulse wheel 7c (to drive tachometer 7). Standard automotive turbochargers assemble the center section to the compressor housing and turbine housing with either bolts or bolted "V" clamps. While "V" clamps used on turbochargers can be removed and replaced more quickly than can bolts 301, these "V" clamps contain a toggle mechanism for removing and replacing them rapidly. "V" clamps are used at; horn 4, tail pipe 3a, exhaust nozzle 3b, and combustor housing 2b where it connects to turbine 1b. The hose connecting the combustor housing to the compressor outlet is equipped with standard automotive worm-gear clamps.

Designing an aircraft jet engine is primarily an engineering task, but it often requires some fine tuning to obtain proper functioning. For training students and for experimenting with engineers working in product development, this invention can contain a number of variations of each major component, each variation representing specific value changes from others. For example, with the kit will be a number of configurations of burner can 2d, swirler dome 2e, turbine 1b, compressor 1a, exhaust nozzles 3b and 3c, fuel nozzle 2c, ignition system 9, and instruments and controls 80.

A few of many possible attachments, in lieu of conical exhaust nozzle 3b, are: telescoping nozzle 3c, for adjusting at clamp 3m, to suit snowblowing conditions; power turbine 3e, for developing mechanical output at shaft 3h; and augmenter (afterburner) 3d, with flame holder 3g, for increasing jet engine output by at least 25%.

Entrained vacuum generator 3f, engulfs ambient air 3j, for many applications. It can be used as a vacuum cleaner and to pick up granular materials for being transported elsewhere, or in place of a fan to pump large volumes of air, or to evacuate and ventilate tunnels, and large chambers.

Entrained volume of air 3j, can be limited by restrictor means 3k (shown as a damper), to manipulate exhaust gas temperature and velocity for preventing damage to the surface being cleared.

The student or practicing engineer will design a component, complete jet engine or a system modification. Any modification or "improvement" in, the starting means, instruments and controls, ignition system, fuel system, or hardware, must be checked in actual running of a jet engine. After design is completed, the student or engineer will quickly assemble the engine using parts of his/her design, standard parts from the kit, or parts from the kit modified to his/her design, to make a test run. Data gathered from the run will prove or disprove the design or modification.

Description of a Third Preferred Embodiment

Jet Engine Powered Snowblower

As stated in the Background of the Invention, above, the poor application efficiency of aircraft jet engines when adapted to industrial use is illustrated by the high operating costs and low reliability of the jet powered snowblowers used by railroads.

During heavy snow falls, railroads are faced with need for removing snow from track switches to assure their movement as directed. With the many products which are used for this purpose, still the largest number of switches cleared are by hand with broom and shovel. This problem is particularly critical in marshaling yards with thousands of switches to be cleared quickly.

Giant jet engine powered snowblowers, as a machine manufactured under Wylie U.S. Pat. No. 2,802,286, are used for that purpose. The only available engines capable of doing this work are modified aircraft engines. Working in circumstances for which they were not designed and with operators and mechanics unskilled in their complex technology, failures are common and costly. As the capital investment in such a large machine is high and fuel consumption is excessive, only the largest switch yards can afford their investment. There is immediate need by branch line railroads and industries served by railroads for engines of my invention, for use as snowblowers.

A major cost in operating aircraft engine powered snowblowers is that the exhaust nozzle off the one large engine is sufficiently wide to clear the full width of the track, from tie end to tie end. Railroad personnel have acknowledged that most of the fuel to accomplish this is wasted. This invention was developed to be more efficient in that only the top of each rail and a few inches on each side of each rail are normally cleared.

This same problem faces many commercial, industrial, commercial and military enterprises. For example; airports, ships, highways, race tracks and outdoor utilities often need affordable equipment for melting and removing many types of granular materials.

The primary purpose of this invention is to clear track switches and third rails (for electrically propelled trains) so that trains may travel them. It is required that snow and ice be removed not only from the top of the rail, but also from the switch points and from the crib, the area between two adjacent ties, in which the connecting rod moves, and various switch mechanism which lie out of the immediate vicinity of the rails.

Figure 6A:
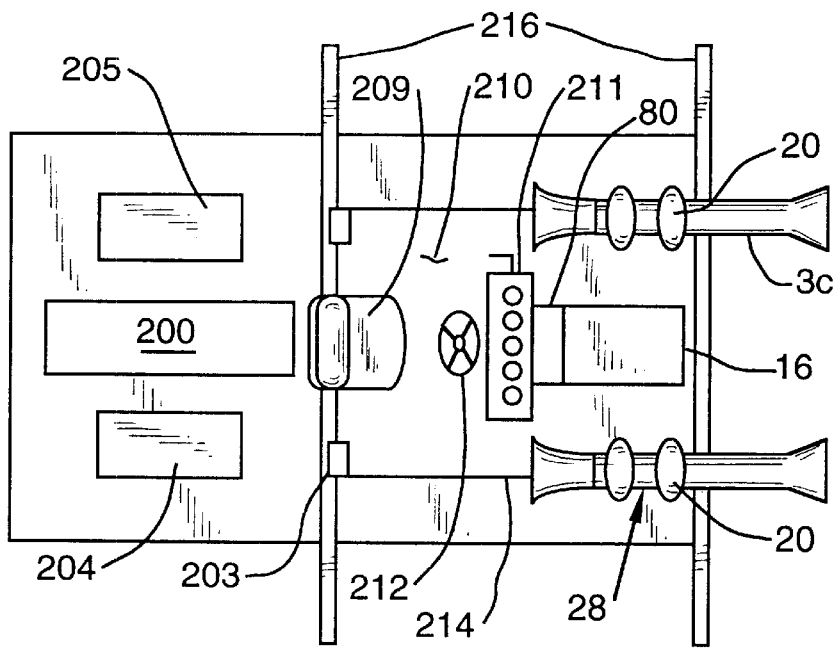
FIG. 6A is a schematic plan view of the jet engine of the present invention adapted for snow blowing use on railroad tracks.
Figure 6B:
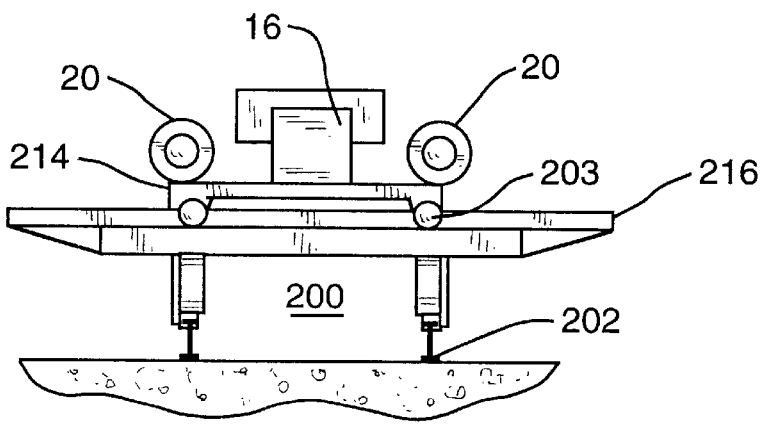
FIG. 6B is a schematic view in front elevation of the railroad snow blower configuration illustrated in FIG. 6A.
Figure 6C:
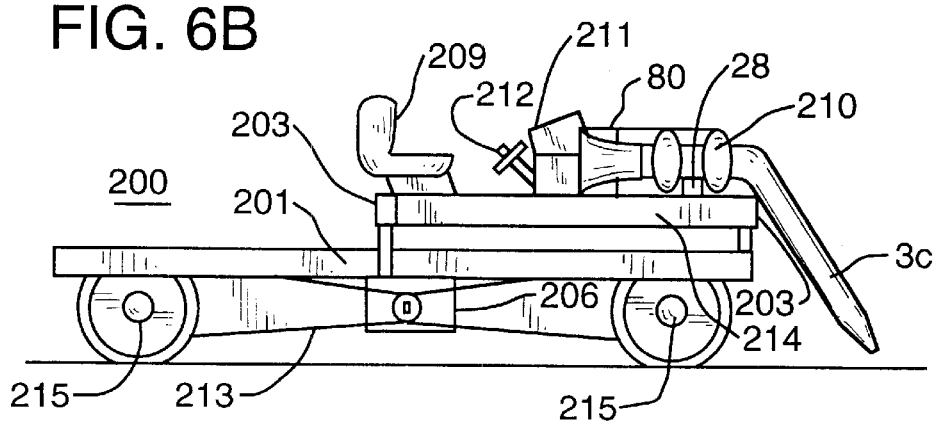
FIG. 6C is a schematic view in side elevation of the railroad jet engine snow blower configuration illustrated in FIG. 6A.

Referring to FIG. 6, (with 6A a plan view, 6B a side elevation, and 6C front elevation, with exhaust nozzles removed for clarity): a description of the third preferred embodiment jet engine powered snowblower 200 is provided. Two multi-use jet engines 20 are positioned atop a conventional railroad cart 201, such that the high velocity, high temperature exhaust from each nozzle 3c (FIG. 5) impinges upon railroad rails 202, and on a selected minimum area on each side of each rail. Exhaust temperature, velocity, and fan pattern are designed, as detailed below, to blow loose snow and to melt frozen snow and ice as required.

As the configuration of this embodiment is a self-propelled snowblower, it must be self-sufficient. Thus, all ancillary power requirements, including that for propulsion on the track, are driven from an on-board motor generator 204.

Item 204 furnishes DC and AC power for instruments and controls (80) and AC power for pumps 14 and 15 via electric motor 13, ignition system 9, air compressor 205, and hydrostatic drive 206 for propulsion. Compressor 205 and hydrostatic drive 206 come equipped with independent electric motors. M/G and the compressor are placed partially submerged within the frame at the rear corners of the cart. Hydrostatic drive 206 is located underneath the frame.

Duplication of requirements for the two engines, as items for starting, running, and controlling the two engines individually or in unison, is overcome by sharing from single sources where practical. Therefore, both jet engines are supplied from one ancillary motor 13, oil reservoir 16, oil pump 14, fuel pump 15, air compressor 205, fuel tank 50, ignition transformer 9b and source of electricity, M/G 204.

The working platform 210, is an assembly composed of: operator's seat 209, control panel 211 (containing instruments and controls 80), oil reservoir 16 and two jet engines 20. Reservoir 16 is centrally mounted on sub frame 214 with one engine on either side. Each engine is normally fastened down with its exhaust nozzle 3b aligned with its associated track rail 202. The locations of engines 20 can be spaced manually to suit special requirements of individual railroads.

Sub frame 214, containing working platform 210, is supported by rollers 203 on two light fabricated parallel support rails 216 set normal to railroad rails 202. This allows lateral movement of the operator's station (with engines) as a unit. As the movement is made only occasionally, and very slowly with low force, this is accomplished by a hand crank operated chain, cable or screw drive 212.

Snowblower travel along the railroad track must vary in speed from inches-per-minute to a fast human walling speed or greater, both in forward or reverse directions. Mechanical drives, with sifting transmission and clutch, cannot meet this requirement. The ability to accomplish this need is the prime feature of hydrostatic transmissions, which are commonly used on riding garden tractors and therefore are mass produced and are reliable and inexpensive.

Hydrostatic transmission 206, powered by an integral electric motor, is connected by roller chains and sprockets 213, to both axles 215, of cart 201. This gives the desirable four wheel drive.

Nozzles 3c are so constructed that they may be extended and swiveled about the engines central axis for clearing switch stands, "third rails" and other areas located near the track. For sever icing conditions, augmenter 3d (FIG. 5) may be substituted for nozzles 3c, for the ability to raise exhaust temperature and velocity by 25% or more.

For manipulative exhaust characteristics, in addition to by throttle control, ambient air can be entrained with installing nozzle 3f for lower temperature or velocity while increasing mass air flow, or for vacuuming to suit special requirements.

With both engines running, and positioned over the railroad rails, the operator advances the snowblower slowly along the railroad track, while clearing the rails immediately ahead. At times it will be necessary to move the operator's station laterally for removing snow or ice from switch rods, switch stands and other equipment. It is likely that each switch in the cross-connecting rod laying in the crib (space between two ties) must be cleared. For that operation the machine travel must be discontinued with the two exhaust nozzles over the crib. The working platform is then moved latterly, with each nozzle clearing half the length of the crib.

It is obvious that principals of these three embodiments can be modified for many other applications within the scope of this invention. For example: for clearing pot holes on highway, a single engine version of this snowblower would both clear loose material and heat the pot hole for improved adhesion of the patch material; a simple engine mounted on the articulated arm of a "cherry picker" type crane, with ancillaries located on the machines base, would permit development of an enormous families of new apparatus.

It can be seen that I have provided means which overcome shortcomings of prior apparatus for adapting jet aircraft engines and technology to land based use. Those skilled in the art will appreciate that changes or modifications other than those indicated may be made in the invention without department from the spirit and scope of this invention.

The essential characteristics of this invention are defined in the following claims.

I claim:

1. A jet engine comprising: a compressor and a turbine and a combustor connected between the compressor and the turbine, said combustor adapted for taking in air from said compressor and combusting fuel with compressed air from said compressor to provide an exhaust for driving said turbine, control means for starting and controlling the operation of the jet engine, said control means including a fuel supply system for supplying fuel under pressure to said combustor for combustion and an externally supported fuel ignitor in said combustor for igniting fuel supplied to said combustor, said control means further including an air nozzle adapted for injecting high velocity compressed air from an independent source into said compressor for inducing start-up rotation of said compressor and said turbine, and a pressure sensor in said combustor and adapted for discontinuing the flow of air from said nozzle and for discontinuing ignition from said fuel ignitor in said combustor when a predetermined minimum pressure for self-sustaining operation of said engine is attained, said control means including a self-correcting shutdown mechanism for igniting fuel in said combustor upon occurrence of flame-out when said fuel supply system is set in other than an off position after self-sustaining operation of the engine has been attained.

2. A method of operating a jet engine having a compressor and a turbine and a combustor connected between the compressor and the turbine, the combustor being adapted for taking in air from the compressor and combusting fuel with compressed air from the compressor to provide an exhaust for driving the turbine, the method comprising the steps of:

injecting air under pressure into said compressor in high velocity from a nozzle for providing start-up rotation of said compressor and said turbine and supply compressed air to said combustor;

supplying fuel to said combustor for combustion;

igniting the supplied fuel from an externally supported ignition source in said combustor for combusting the fuel with the compressed air and thereby driving said turbine with exhaust gases from said combustor;

sensing pressure in said combustor;

discontinuing the injection of air and the igniting of the supplied fuel from the externally supported ignition source when the pressure sensed in said combustor attains a predetermined minimum sufficient for self-sustained operation of said jet engine;

sensing flame-out of the engine; and reigniting the fuel supplied to said combustor with the externally supported ignition source when flame-out is sensed.

3. The method of claim 2, including the step of heating the fuel supplied to said combustor.

4. The method of claim 3, including the step of heating the fuel being supplied to said combustor with lubrication oil heated from circulation through the jet engine for lubrication.

\* \* \* \* \*